United States Patent
Tamaki et al.

(10) Patent No.: US 8,451,310 B2
(45) Date of Patent: May 28, 2013

(54) IMAGE FORMING APPARATUS

(75) Inventors: Kenji Tamaki, Tokorozawa (JP);
Masashi Sugano, Hachioji (JP); Akinori Kimata, Toyokawa (JP); Katsunori Takahashi, Hachioji (JP); Akifumi Isobe, Hidaka (JP); Satoshi Shimao, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 4 days.

(21) Appl. No.: 13/309,907

(22) Filed: Dec. 2, 2011

(65) Prior Publication Data
US 2012/0147115 A1 Jun. 14, 2012

(30) Foreign Application Priority Data
Dec. 9, 2010 (JP) .................. 2010-274842

(51) Int. Cl.
*B41J 27/00* (2006.01)
*B41J 2/435* (2006.01)
*B41J 2/47* (2006.01)

(52) U.S. Cl.
USPC ........... 347/261; 347/237; 347/247; 347/240; 347/254

(58) Field of Classification Search
USPC ........................ 347/237, 240, 247, 254.261
See application file for complete search history.

(56) References Cited

U.S. PATENT DOCUMENTS
5,361,329 A * 11/1994 Morita et al. .................. 358/1.2
2011/0285804 A1 * 11/2011 Esumi ........................... 347/224

FOREIGN PATENT DOCUMENTS
JP 2006-224654 A 8/2006
JP 2006-258946 A 9/2006

* cited by examiner

*Primary Examiner* — Stephen Meier
*Assistant Examiner* — Sarah Al Hashimi
(74) *Attorney, Agent, or Firm* — Cantor Colburn LLP

(57) ABSTRACT

An image forming apparatus including; an exposure section provided with, a light emitting element, a polygon mirror to receive light beams from the light emitting element, and to expose an image carrier using light beam via the polygon mirror based on image data; an image processing section to adjust image magnification by image processing of the image data; and, a control section configured to select at least either of a first magnification adjustment to change a rotation speed of the polygon mirror and a second magnification adjustment to carry out image processing of the image data by the image processing section, based on comparison results between a paper interval time during recording paper conveyance in image formation and the first magnification adjustment time required to stabilize polygon mirror rotation in the first magnification adjustment, when adjusting image magnification with respect to recording paper.

7 Claims, 7 Drawing Sheets

IMAGE FORMING APPARATUS

RELATED APPLICATION

The present application is based on Patent Application No. 2010-274842 filed at the Japan Patent Office on Dec. 9, 2010 and which is hereby incorporated herein in its entirety.

TECHNICAL FIELD

The present invention relates to an image forming apparatus such as a copier and a printer, and specifically to an image forming apparatus having a function to carry out writing on a recording medium such as a photoreceptor by laser beams from a light source scanned by a polygon mirror.

BACKGROUND

In various types of image forming apparatuses such as laser printers, copiers, and facsimile machines, an image forming operation thereof is carried out via processes each referred to as charging, exposure, development, transfer, and fixing.

Specifically, initially, by irradiation of light beams (laser beams) modulated based on image data, on the surface of a charged photoreceptor drum, an electrostatic latent image of an image to be subjected to image formation is formed, and then this electrostatic latent image is developed as a toner image using a developing device. The thus-formed toner image is transferred onto a transfer medium (a recording paper) by a transfer roller. Then, in a fixing device, the toner image on the recording paper is fixed by fixing heat to form an image on the recording paper.

When a toner image is fixed onto a recording paper, there occurs a phenomenon such that moisture in the recording paper is removed by fixing heat and thereby the recording medium is contracted. Especially when double-sided image formation is carried out, there is produced a problem such that due to recording paper contraction during fixing of a first face (front face), the image sizes of a first face (front face) and a second face (reverse face) of a recording paper become different and thereby the image sizes of the front face and the reverse face are misaligned.

In such a case, when pixel clock cycle is changed and also the rotation speed of a polygon mirror is changed, the front and reverse image sizes can be matched, for example, via fine adjustment of the image magnification of the reverse face side. This image magnification adjustment by the polygon mirror rotational speed change produces an advantage in which no image quality degradation occurs, but there is noted the problem that it takes a certain period of time to change the rotation speed of the polygon mirror.

Further, in the same manner, image processing also makes it possible that via fine adjustment of the image magnification of the reverse face side, the front and reverse image sizes are matched. This image magnification adjustment via image processing can be processed for a short time differently from the case of a polygon mirror, but in contract, there is a problem in which thinning-out and interpolation cause image quality degradation.

Incidentally, other than thermal contraction of a recording paper as described above, the operator occasionally gives instructions of slight enlargement or reduction of an image. Such a case can also be handled by the polygon mirror rotational speed change or image processing.

There exist, for example, Patent Documents 1 and 2 as described below referring to the control of the rotation speed of a polygon mirror in this manner.

Incidentally, a polygon mirror is driven by PLL (Phase Locked Loop) control, being rotated at a high speed of several tens of thousands of rotations per minute. Further, when the rotation speed is changed depending on the fine adjustment of image magnification as described above, it is necessary to take a certain period of time (stabilizing time) until both the PLL control and the rotation of the polygon mirror reach a stable state.

On the other hand, in a recent image forming apparatus, high-speed processing is demanded. With a decrease in paper feeding interval within an image forming apparatus, paper interval time, in which switching from image formation on the recording paper front face to image formation on the recording paper reverse face is carried out, is also decreased. Herein, the sheer interval time refers to a time in which no recording paper exists in the exposure section or the transfer section, namely, until the front edge of a next recording paper arrives after the tailed edge of a preceding recording paper conveyed during image formation has passed.

Therefore, in the case where image magnification adjustment is carried out by polygon mirror rotational speed change, when the stabilizing time due to the polygon mirror rotational speed change is more than the above paper interval time, it is necessary to decrease the number of circulating paper (the number of recording paper circulating in an image forming apparatus at a time) during double-sided image formation to extend the paper interval time.

In this case, for example, when such a paper interval time is extended via a decrease from 4 sheets of paper to 3 sheets of paper in the number of circulating paper, the productivity of the image forming apparatus is decreased to ¾.

In the techniques described in Patent Documents 1 and 2, the above stabilizing time has been attempted to decrease by optimizing the control of a polygon mirror PLL-driven via elimination of unnecessary processings.

However, with a demand for the productivity of an image forming apparatus, the paper interval time has been decreased more and more and also the reduction of the stabilizing time of a polygon mirror, as described above, is limited, whereby the stabilizing time of the polygon mirror occasionally exceeds the paper interval time depending on productivity, and thereby, the stabilizing time of the polygon mirror has inhibited productivity enhancement.

On the other hand, without the change of the rotation speed of a polygon mirror, image magnification adjustment can be carried out via image processing of image data. However, this method has occasionally produced the problem of image quality degradation.

Namely, in the image magnification adjustment, no method to optimize productivity enhancement (productivity decrease prevention) and image quality maintenance (image quality degradation prevention) has been established.

An object of the present invention is to provide an image forming apparatus in which in image magnification adjustment in an apparatus to form an image by polygon mirror scanning of light beams, image formation can be carried out with excellent image quality in the range of no decrease in productivity.

SUMMARY

To achieve at least one of the above mentioned objects, an image forming apparatus includes an image carrier, an exposure section provided with, a light emitting element, a polygon mirror to receive a light beam from the light emitting element, a polygon motor to rotate the polygon mirror, and a motor drive section to drive the polygon motor based on a polygon drive clock, the exposure section exposing the image carrier using light beams via the polygon mirror based on image data, a developing section to develop an electrostatic latent image by a toner, the electrostatic latent image being formed on the image carrier by the exposure section, a transfer section to transfer a toner image onto a recording paper, the toner image being formed on the image carrier by the developing section, an image processing section to adjust image magnification by image processing of the image data, and a control section configured to select at least either of a first magnification adjustment to change a rotation speed of the polygon mirror by the motor drive section and a second magnification adjustment to carry out image processing of the image data by the image processing section, based on comparison results between a paper interval time during recording paper conveyance in image formation and the first magnification adjustment time required to stabilize polygon mirror rotation in the first magnification adjustment, when adjusting image magnification with respect to the recording paper.

BRIEF DESCRIPTION OF THE INVENTION

DESCRIPTION OF THE PREFERRED EMBODIMENT

With reference to the drawings, the embodiment to carry out the image forming apparatus of the present invention will now be detailed.

[Constitution of the Image Forming Apparatus]

Figure 1:
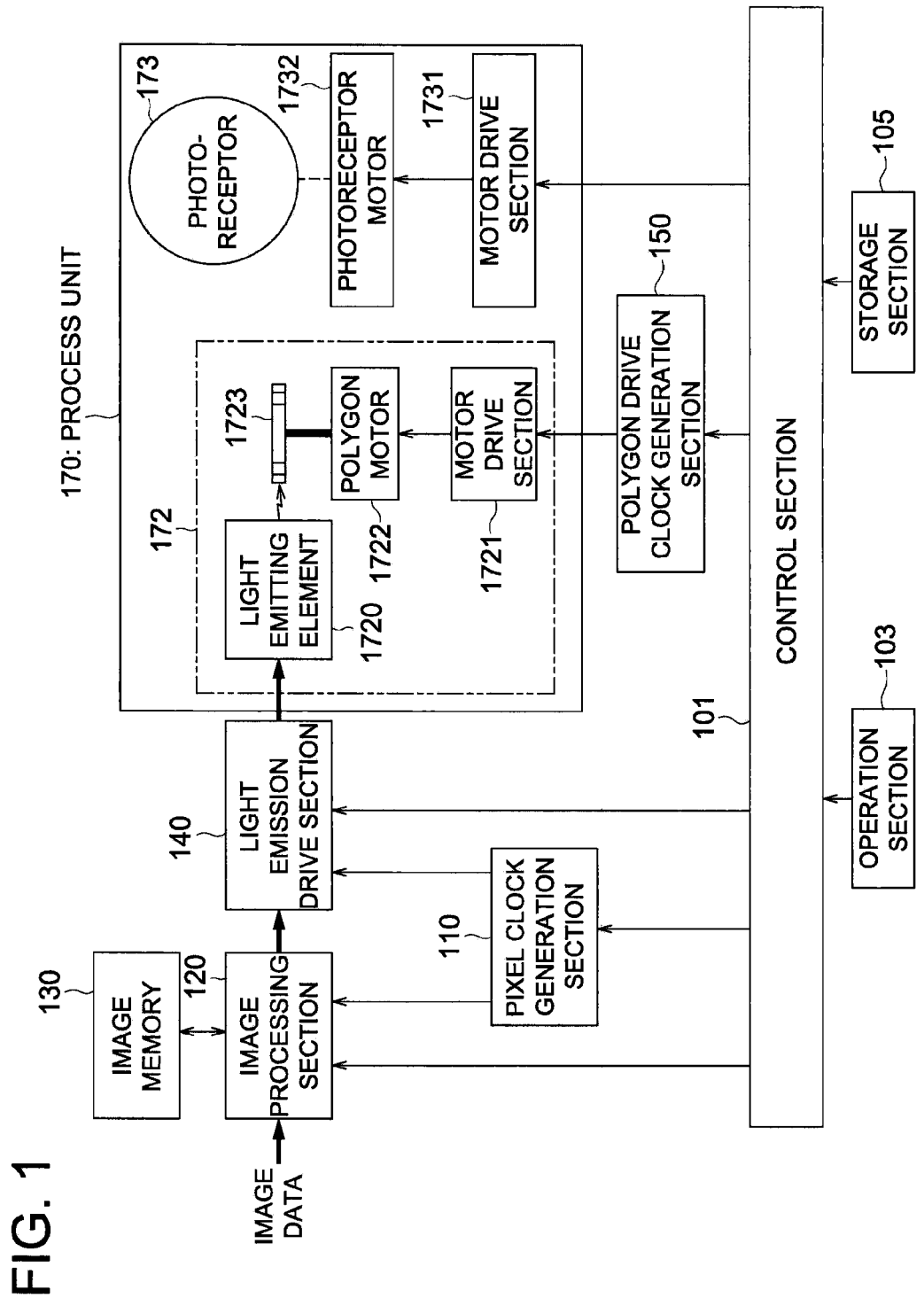
FIG. 1 is a constitutional view showing a schematic constitution of an embodiment of the present invention.

Herein, the constitution of an image forming apparatus 100 of a first embodiment will be detailed with reference to FIG. 1 (block diagram) and FIG. 2 (cross-sectional constitution view).

Incidentally, description on general portions well-known in an image forming apparatus and not directly relevant to any characteristic operation or control of the present embodiment will be omitted. Further, in this embodiment, the direction where an image carrier is moved or a recording paper is conveyed is referred to as the vertical scanning direction. And, the direction at right angles to this vertical scanning direction is referred to as the main scanning direction. As a recording paper is conveyed in the vertical scanning direction and also an image carrier is moved in the vertical scanning direction, via repetitive exposure of the main scanning direction onto the image carrier, a two-dimensional image is formed and then the image on the image carrier is transferred onto the recording paper to form a desired image on the recording paper.

In the image forming apparatus 100, a control section 101 incorporates a CPU to control each section of the image forming apparatus 100 and operates in response to a control program. Herein, this control section 101 is characterized by carrying out control based on a flowchart to be described later.

Herein, in this embodiment, to adjust image magnification with respect to a recording paper, the control section 101 functions to select at least either of a first magnification adjustment to change the rotation speed of a polygon mirror and a second magnification adjustment via image processing.

An operation section 103 is to input various kinds of operations by the operator of the image forming apparatus and incorporates various switches and keys.

A storage section 105 is a storage member to store various kinds of data, and, in this embodiment, contains a control program required for the operation of the image forming apparatus 100 and various kinds of data used to control image conditions.

A pixel clock generation section 110 is a clock generation member to generate a pixel clock used in image processing for image data and exposure. Incidentally, when image magnification adjustment is carried out by use of the change of the rotation speed of a polygon mirror 1723 via a polygon drive clock generated by a polygon drive clock generation section 150 to be described later, a periodical change in the pixel clock is carried out together by the pixel clock generation section 110.

An image processing section 120 is a processing member to carry out image processing for image data to be subjected to image formation, being, in this embodiment, a processing member to carry out image processing for image magnification adjustment such as enlargement or reduction.

An image memory 130 is a storage member to store image data, being used as a work memory during the image magnification adjustment of the image processing section 120.

A light emission drive section 140 is a drive member to generate an exposure drive signal based on image data having been subjected to image processing.

A polygon drive clock generation section 150 is a clock generation member to generate a polygon drive clock required for the rotational drive of the polygon mirror 1723 to be described later via PLL (Phase Locked Loop) control.

A process unit 170 is a writing unit to carry out operations to form an image (a toner image) on a recording paper, incorporating an exposure section 172 and a photoreceptor 173.

Herein, the exposure section 172 is provided with a light emitting element 1720 such as a laser diode emitting light by receiving an exposure drive signal from the light emission drive section 140, a motor drive section 1721 to drive a polygon mirror 1722 in response to a polygon drive clock, a polygon motor 1722, rotationally driven by the motor drive section 1721, to rotate a polygon mirror 1723 at a predetermined rotation speed, and a polygon mirror 1723, rotationally driven by the polygon motor 1722, to scan the surface of the photoreceptor 173 using light beams from the light emitting element 1720.

Further, the photoreceptor 173 in which an electrostatic latent image formed via light beam exposure is developed to form a toner image is rotated at a predetermined rate by a photoreceptor motor 1732 driven by a motor drive section 1731.

Other constituent elements of the process unit 170 will be detailed with reference to FIG. 2. Herein, although an omission is made in FIG. 1, the image forming apparatus 100 can carry out image formation for a plurality of colors and therefore a process unit is arranged for each color.

Next, with reference to FIG. 2, the mechanical constitution of the image forming apparatus 100 will be described.

A conveyance section 160 is a conveyance member to convey, at a predetermined conveyance rate, a recording paper having been sent out from a paper feeding section T, incorporating a registration roller as well as other conveyance rollers and conveyance belts. Herein, this conveyance section 160 is provided with a reverse conveyance section 165 to reverse and then circulate a recording paper during image formation on both sides of a recording paper.

The process unit 170 is a writing unit to carry out various kinds of operations to form an image on a recording paper and incorporates a charging section 171 to provide a photoreceptor 173 with a predetermined charge, an exposure section 172 to expose a photoreceptor 173 based on image data, a photoreceptor 173 serving as an image carrier on which an electrostatic latent image is formed via exposure, a developing section 174 to develop an electrostatic latent image of the photoreceptor 173 to form a toner image, an intermediate transfer body 175 serving as an image carrier on which a toner image on the photoreceptor 173 is transferred to carry the toner image, and a transfer section 176 to transfer a toner image on the intermediate transfer body 175 onto a recording paper.

Figure 2:
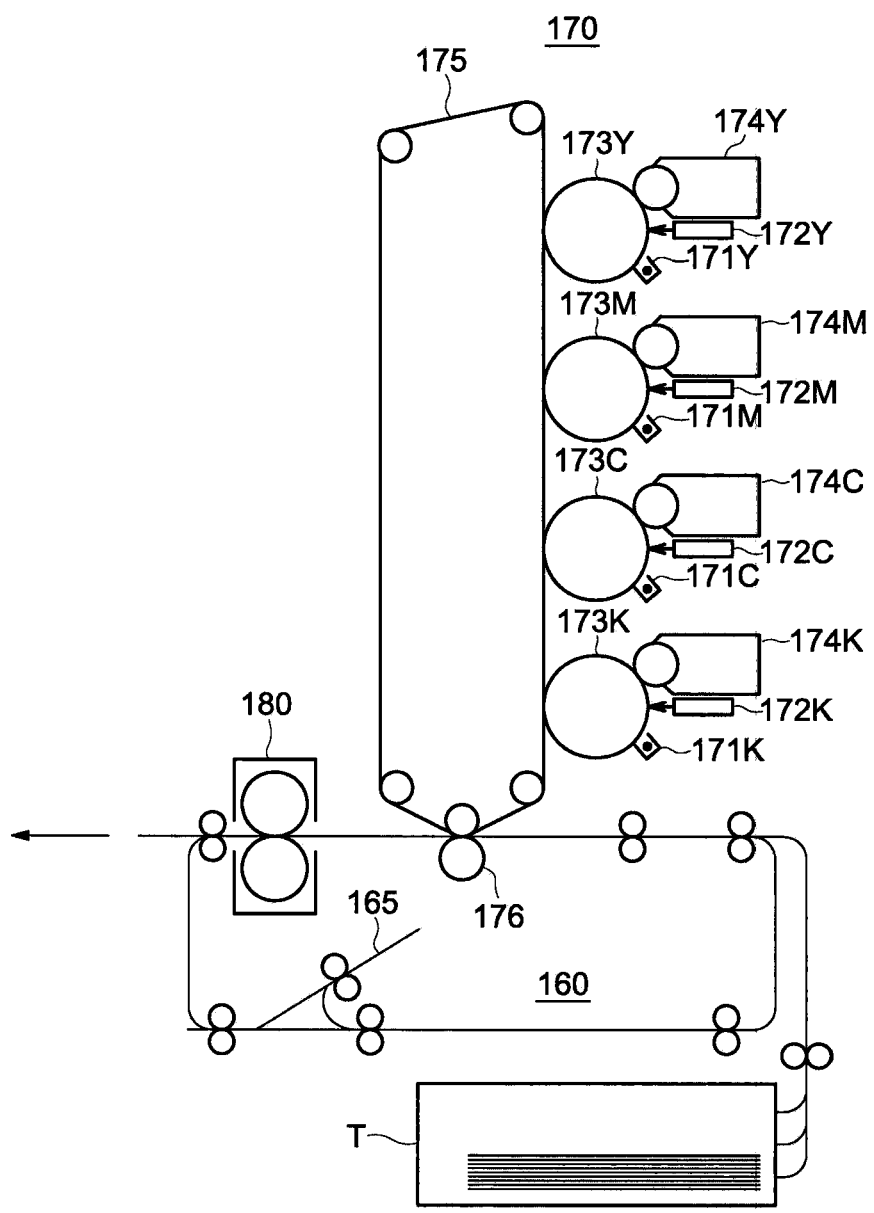
FIG. 2 is a constitutional view showing a schematic constitution of the embodiment of the present invention.

Incidentally, in the case where the image forming apparatus 100 is a color image forming apparatus to compose toner images of a plurality of colors, as shown in FIG. 2, the process unit 170 has such a constitution that a charging section 171, an exposure section 172, a photoreceptor 173, and a developing section 174 are provided for each color, and then, on the intermediate transfer body 175, toner images of individual colors are superimposed to be finally transferred onto a recording paper.

Herein, the photoreceptor 173 may a belt-shaped one instead of a drum-shaped one. In the same manner, the intermediate transfer body 175 may be a drum-shaped one instead of a belt-shaped one.

While nipping and conveying a recording paper on which a toner image has been transferred, a fixing section 180 carries out fixing via heating and pressing to allow the toner image to be stable on the recording paper.

[Operation (1) of the Image Forming Apparatus]

With reference to the flowchart of FIG. 3 and the characteristic chart of FIG. 4, the operation of the image forming apparatus 100 will now be described.

Herein, the image forming apparatus 100 operates based on a control program of the control section 101. A fundamental operation of this control program is shown in the flowchart of FIG. 3.

Figure 3:
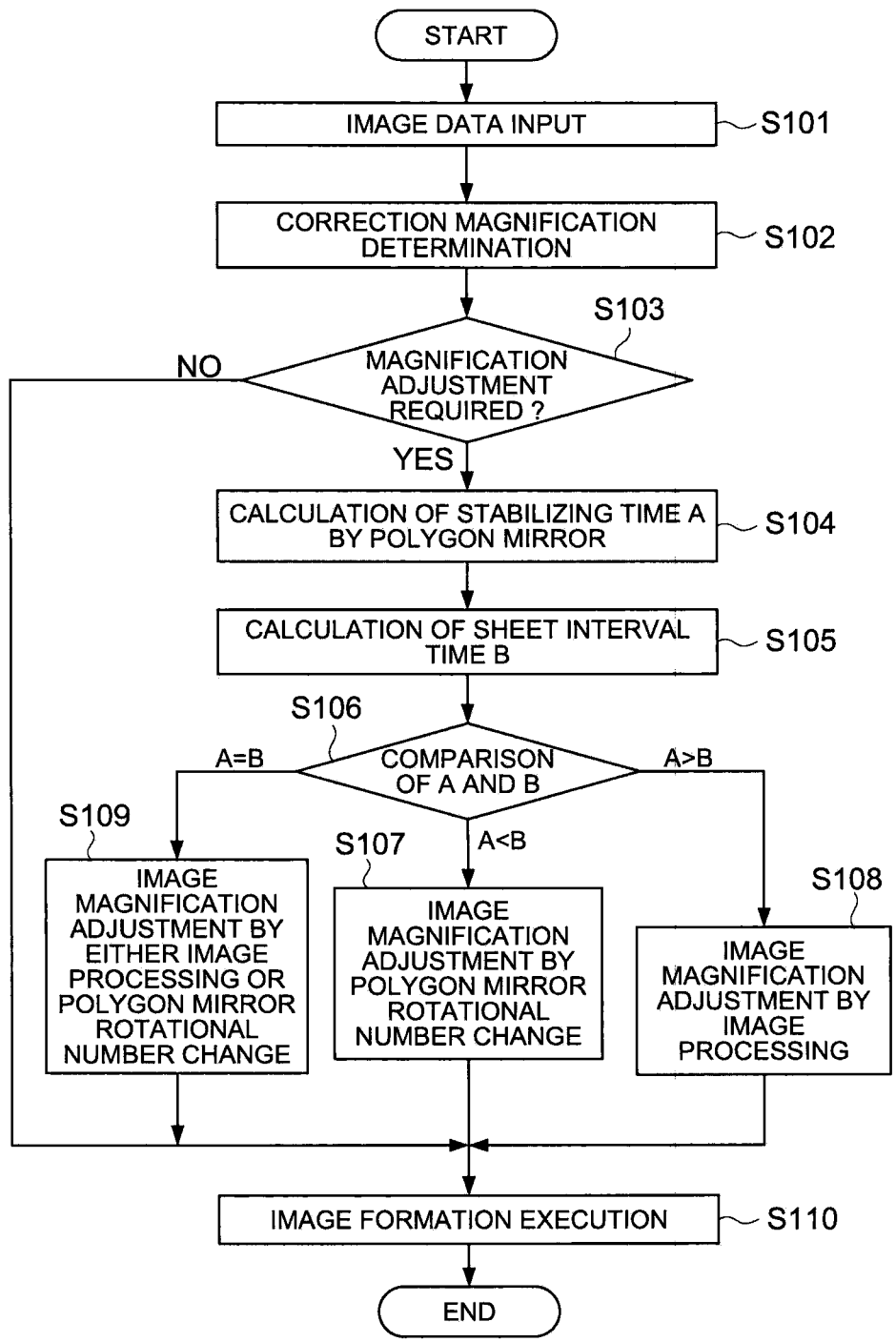
FIG. 3 is a flowchart showing the operation of the embodiment of the present invention.

Initially, data to be subjected to image formation is input from an external device or selected from data stored in the image memory 130 of the image forming apparatus 100 by instructions of the operation section 103 (step S101 in FIG. 3).

Then, the operator makes various kinds of settings relevant to image formation from the operation section 103 (step S102 in FIG. 3).

Incidentally, as described above, when a toner image is fixed onto a recording paper, there occurs a phenomenon such that moisture in the recording paper is removed by the heat of the fixing section 180 and thereby the recording medium is contracted. Especially when double-sided image formation is carried out, there is produced a problem such that due to recording medium contraction during first face (front face) fixing, the image sizes of a first face (front face) and a second face (reverse face) of a recording paper differ.

Since the contraction rate of a recording paper differs depending on the type of a recording paper, the fixing temperature, and the conveyance rate, the control section 101 refers to adjustment amount data stored in the storage section 105 to acquire an adjustment amount having been allowed to correspond to the type of a recording paper and the fixing temperature.

Herein, since the contraction of a recording paper delicately differs depending on image formation conditions such as the type of a recording paper, the fixing temperature, and the conveyance rate, an adjustment amount based on such various conditions may be automatically determined or an adjustment amount may be determined based on a test print.

For example, the control section 101 outputs a test print for double-sided image formation with respect to test data in the state where no magnification adjustment has been carried out for a recording paper first face and test data in which magnification adjustments of plural steps have been carried out for a recording paper second face at an adjustment amount of about ±0.1%. For example, when the adjustment amount determined based on image formation conditions is 0.6%, double-sided image formation for 5 sheets of paper is carried out in which adjustment amounts of 0.50%, 0.55%, 0.60%, 0.65%, and 0.70% have been applied to the rear face. Then, the operator visually observes the test prints having been subjected to double-sided image formation in the state where this adjustment amount has been applied to confirm matching of the front and rear images, and then inputs a matched adjustment amount from the operation section 103. In this manner, an adjustment amount based on test prints is determined (step S102 in FIG. 3). Herein, when no input is made from the operation section 103, an adjustment amount determined based on image formation conditions is applied as-determined.

Further, even on the basis of no test print, when the operator has manually input an image magnification adjustment, the control section 101 acquires the input value from the operation section 103 as an adjustment amount.

At this moment, the control section 101 determines whether image magnification adjustment is required (step S103 in FIG. 3). For example, when the double-sided image formation mode has been set or a manual input has been made for image magnification adjustment by the operator via the operation section, the control section 101 determines the necessity of image magnification adjustment.

Herein, in the case of single-sided image formation or in the case of use of a special recording paper exhibiting no contraction even via fixing, the unnecessity of image magnification adjustment is determined (NO in step S103 in FIG. 3) to initiate image formation (step S110 in FIG. 3).

On the other hand, when image magnification adjustment as in double-sided image formation is required (YES in step S103 in FIG. 3), the control section 101 determines a stabilizing time A due to the rotational speed change of the polygon mirror 1723 in the case of application of the above adjustment amount (step S104 in FIG. 3).

Figure 4:
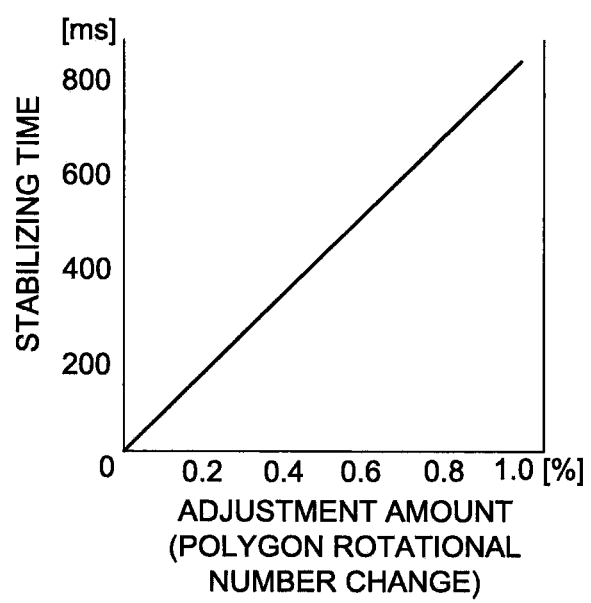
FIG. 4 is a characteristic chart showing the operation of the embodiment of the present invention.

Incidentally, in the case of the first magnification adjustment by the rotational speed change of the polygon mirror 1732, as shown in FIG. 4, there is a property in which on the basis of magnification adjustment amount, the above stabilizing time is required. Herein, this stabilizing time includes the processing time of the PLL control in the polygon drive clock generation section 150 and the stabilizing time during mechanical rotational speed change of the polygon mirror 1723, which are collectively referred to as the stabilizing time. In a specific example shown in FIG. 4, the stabilizing time is about 820 ms in the case of an adjustment amount of 1%. Therefore, the control section 101 refers to a look-up table equivalent to FIG. 4 stored in the storage section 105 to determine a stabilizing timer based on the adjustment amount. Herein, other than data reading-out using such a look-up table, the stabilizing time may be calculated using a calculation table.

Further, the control section 101 determines paper interval time B (step S105 in FIG. 3). Herein, the paper interval time B refers to a time in which in the transfer section 176 of FIG. 2, no recording paper exists until the front edge of a next recording paper arrives after the tailed edge of a preceding recording paper has passed, being determined by the relationship of B=(L−n·Lp)/V, provided that L=the path length of the conveyance section 160 in which a recording paper is circularly conveyed, Lp=the length of the conveyance direction of a recording paper, n=the number of recording paper circularly conveyed at the same time in the conveyance section 160, and V=the conveyance rate of a recording paper in the conveyance section 160.

Alternatively, the paper interval time B is determined by the relationship of B=(M−Lp)/V=((V/N)−Lp)/V, provided that N=the number of recording paper output for image formation per second, V=the conveyance rate of a recording paper in the conveyance section 160, Lp=the length of the conveyance direction of a recording paper, M=the distance from the recording paper front edge to the following recording paper front edge during conveyance, and B=paper interval time.

Incidentally, this paper interval time B may be calculated via calculation by the control section 101 or may be read out with reference to the look-up table stored in the storage section 105 via application of conditional values.

Further, with respect to the process to determine the stabilizing time A (step S104 in FIG. 3) and the process to determine the paper interval time B (step S105 in FIG. 3), whichever may be carried out first, or both may be concurrently earned out.

Herein, the control section 101 compares the stabilizing time A with the paper interval time B (step S106 in FIG. 3). The above comparison by the control section 101 results in 3 divided types of A=B, A<B, and A>B.

Figure 5A:
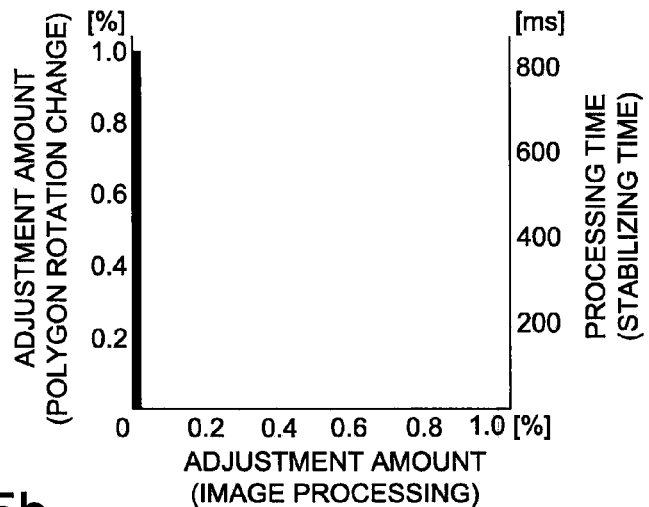
FIG. 5a is a characteristic chart showing the operation of the embodiment of the present invention.

Herein, when the stabilizing time A is less than the paper interval time B (A<B in step S106 in FIG. 3), via control of the control section 101, using the first magnification adjustment of the rotational speed change of the polygon mirror 1723 by a polygon drive clock generated by the polygon drive clock generation section 150, as image magnification adjustment is carried out (step S107 in FIG. 3), image formation is carried out (step S110 in FIG. 3). In this case, there are expressed characteristics in which no image quality degradation due to the image magnification adjustment occurs. Herein, in the case of the rotational speed change of the polygon mirror 1723, as shown in FIG. 5A, there is a property in which depending on the magnification adjustment amount (vertical axis on the left side), a processing time (vertical axis on the right side) based on the stabilizing time is required.

Figure 5B:
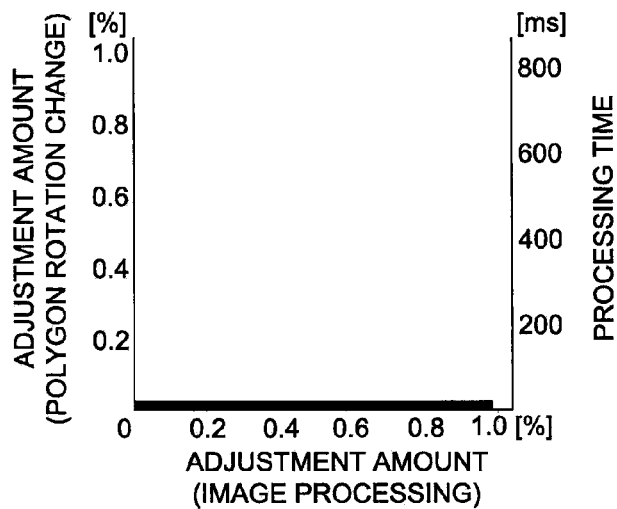
FIG. 5b is a characteristic chart showing the operation of the embodiment of the present invention.

Further, when the stabilizing time A is more than the paper interval time B (A>B in step S106 in FIG. 3), via control of the control section 101, image magnification adjustment is carried out via the second magnification adjustment to enlarge or reduce image data by the image processing section 120 (step S108 in FIG. 3) for image formation (step S110 in FIG. 3). In the case of use of this image processing, there is an advantage in which as shown in FIG. 5B, since image processing is carried out prior to exposure, the processing time is not problematic. Herein, in the case of this image processing, there is a property in which since interpolation or thinning-out of image data is carried out via image processing, image quality is degraded depending on the magnification adjustment amount.

Still further, when the stabilizing time A is equal to the paper interval time B (A=B in step S106 in FIG. 3), via control of the control section 101, since either of the rotational speed change of the polygon mirror 1723 and image processing by the image processing section 120 is employable, on the basis of a preset initial setting value or setting from the operation section 103 (step S102 in FIG. 3), image magnification adjustment by either the rotational speed change of the polygon mirror 1723 or image processing by the image processing section 120 is carried out (step S109 in FIG. 3) for image formation (step S110 in FIG. 3). In this case, the control section 101 may select the rotational speed change of the polygon mirror 1723 since when a character is assigned as the output form of an image, image degradation tends to be noticeable in line portions constituting the character.

As described above, this embodiment makes it possible that in image magnification adjustment in an apparatus to form an image by polygon mirror scanning of light beams, image formation is carried out with excellent image quality in the range of no decrease in productivity.

[Operation (2) of the Image Forming Apparatus]

Figure 6:
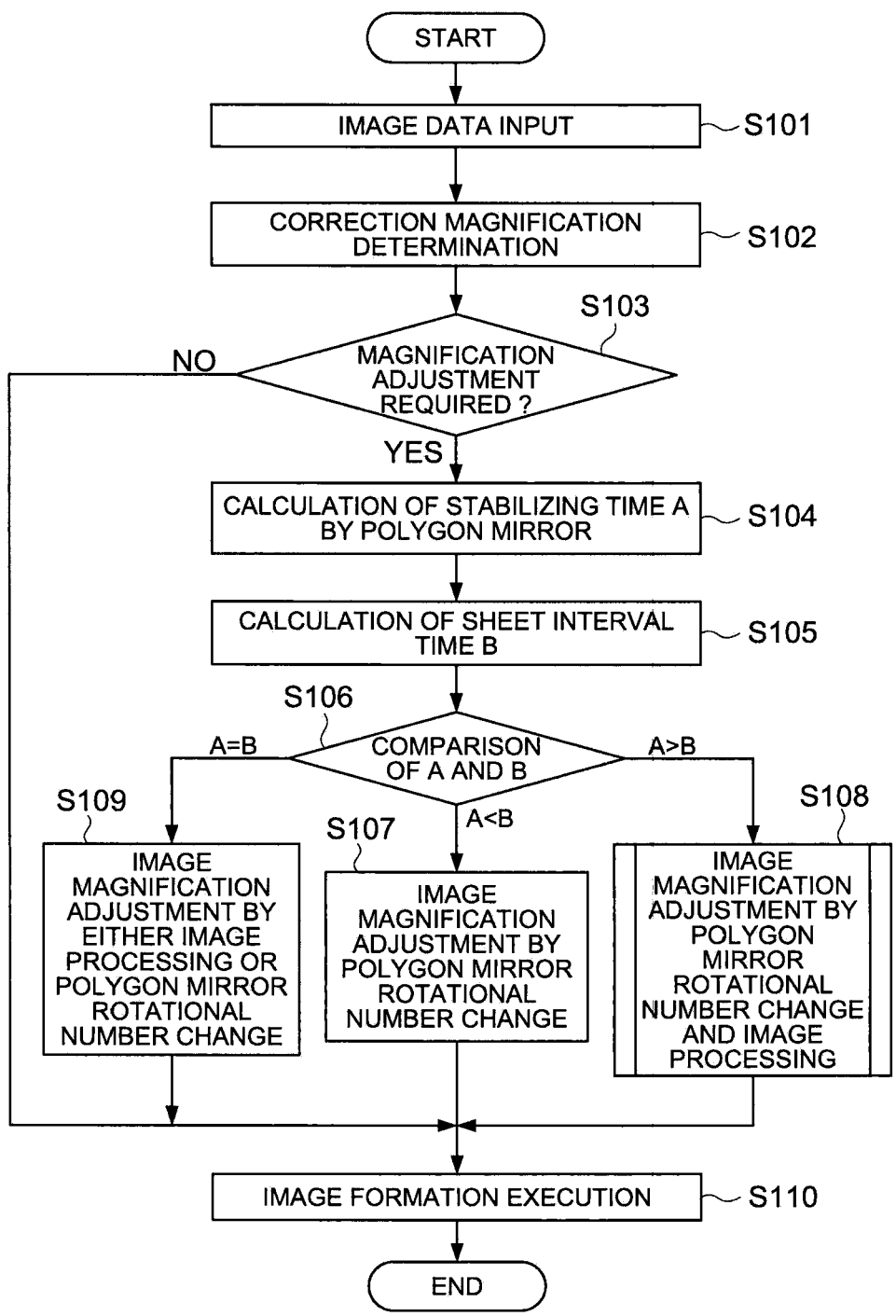
FIG. 6 is a flowchart showing the operation of the embodiment of the present invention.

FIG. 6 shows another operational example in the image forming apparatus of the present embodiment. Herein, the same processings as in FIG. 3 are assigned with the same step numbers and thereby overlapping description is omitted.

By comparison of the stabilizing timer A and the paper interval time B (step S106 in FIG. 6), when the stabilizing timer A is more than the paper interval time B (A>B in step S106 I FIG. 6), via control of the control section 101, both the rotational speed change of the polygon mirror 1723 and image processing of the image processing section 120 are used (step S108 in FIG. 6), and thereby productivity is enhanced with inhibition of image quality degradation at minimum to carry out image formation (step S110 in FIG. 6) as image magnification is adjusted.

Figure 7:
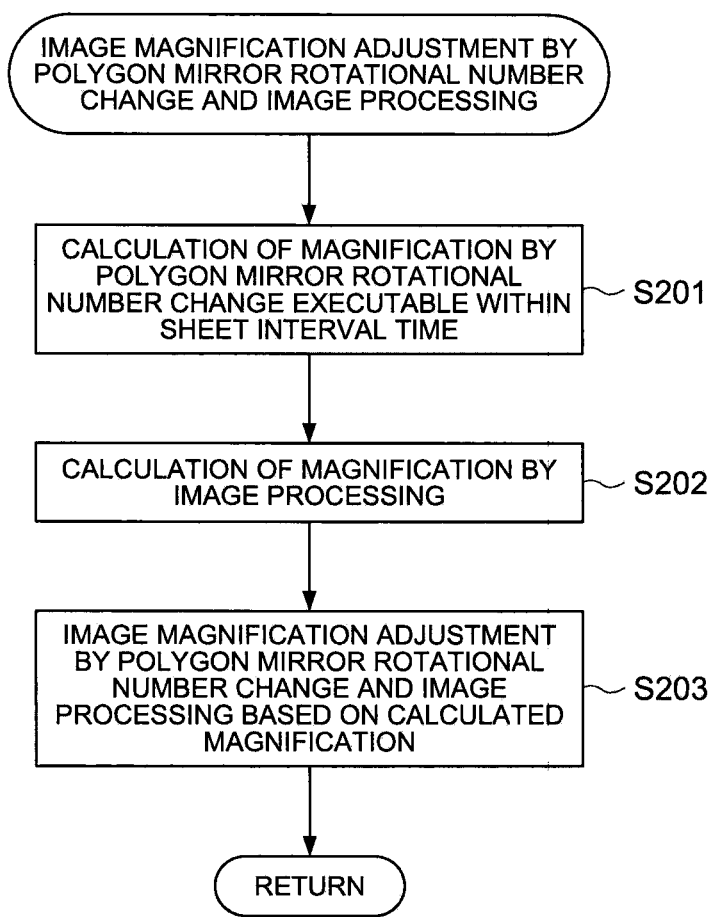
FIG. 7 is a flowchart showing the operation of the embodiment of the present invention.

Herein, in this case, as shown in the flowchart of FIG. 7, magnification adjustment amount executable within the paper interval time B is calculated in the first magnification adjustment by the rotational speed change of the polygon mirror 1723 (step S201 in FIG. 7) and then the residual magnification adjustment amount father required to obtain necessary magnification adjustment amount is allocated to the second magnification adjustment via image processing (step S202 in FIG. 7). Then, on the basis of each magnification having been calculated in this manner, the rotational speed change of the polygon mirror 1723 and image processing of the image processing section 120 are used in combination to carry out image magnification adjustment (step S203 in FIG. 7).

Figure 5C:
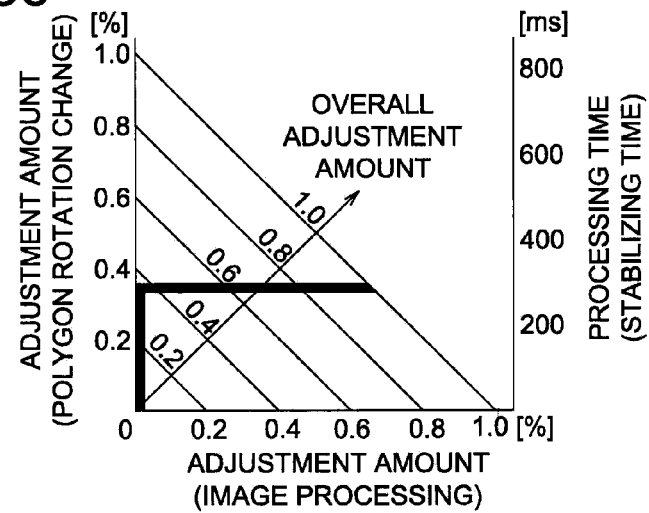
FIG. 5c is a characteristic chart showing the operation of the embodiment of the present invention.

Incidentally, in the characteristic chart of FIG. 5C, magnification adjustment amount by image processing is shown in the horizontal axis and magnification adjustment amount by the rotational speed change of the polygon mirror 1723 is shown in the vertical axis, and the overall magnification adjustment amount in the case of use of both is shown in the axis with an inclination of 45°.

Herein, when in the above expression, N=1, V=300 mm/s, and Lp=210 mm, the paper interval timer B is determined to be B=((V/N)−Lp)/V=300 ms. Further, the polygon mirror rotational speed change equivalent to the value of 300 ms is read to be 0.36% from FIG. 4.

Then, in the case of FIG. 5C, for example, necessary magnification adjustment amount is designated to be 1.0%, and a specific example is shown in which the magnification adjustment amount of the rotational speed change of the polygon mirror 1723 executable within the paper interval time B is designated to be 0.36% and the magnification adjustment amount allocated to image processing is designated to be 0.64%. In FIG. 5C, it is shown that even when a magnification adjustment of +1% has been carried out, the processing time is shorter than in 1% adjustment of FIG. 5A.

On the other hand, as a comparative example, when control has been carried out to make 1% acceleration only by the rotational speed change of the polygon mirror 1723, the stabilizing time is 820 ms as shown in FIG. 4 or in the vertical axis on the right side of FIG. 5A. Namely, when image magnification adjustment is carried out only using the rotational speed change of the polygon mirror 1723, the stabilizing time exceeds 300 ms being the paper interval time B, and thereby it becomes necessary to decrease the number of circulating paper (the number of recording paper circulating in the image forming apparatus at a time) during double-sided image formation, resulting in a decrease in productivity.

As describe above, this embodiment makes it possible that in image magnification adjustment in an apparatus to form an image by polygon mirror scanning of light beams, image formation is carried out with excellent image quality in the range of no decrease in productivity.

EFFECTS OF THE INVENTION

In the present embodiment, when image magnification is adjusted, control is carried out so as to select at least either of the rotational speed change of a polygon mirror via the change of a polygon drive clock and image processing in an image processing section. Thereby, in image magnification adjustment in an apparatus to form an image by polygon mirror scanning of light beams, image formation can be carried out with excellent image quality in the range of no decrease in productivity.

What is claimed is:

1. An image forming apparatus comprising:
   an image carrier,
   an exposure section provided with, a light emitting element, a polygon mirror to receive a light beam from the light emitting element, a polygon motor to rotate the polygon mirror, and a motor drive section to drive the polygon motor based on a polygon drive clock, the exposure section exposing the image carrier using light beams via the polygon mirror based on image data;
   a developing section to develop an electrostatic latent image by a toner, the electrostatic latent image being formed on the image carrier by the exposure section;
   a transfer section to transfer a toner image onto a recording paper, the toner image being formed on the image carrier by the developing section;
   an image processing section to adjust image magnification by image processing of the image data; and,
   a control section configured to select at least either of a first magnification adjustment to change a rotation speed of the polygon mirror by the motor drive section and a second magnification adjustment to carry out image processing of the image data by the image processing section, based on comparison results between a paper interval time during recording paper conveyance in image formation and the first magnification adjustment time required to stabilize polygon mirror rotation in the first magnification adjustment, when adjusting image magnification with respect to the recording paper.

2. The image forming apparatus of claim 1, wherein the control section is configured to adjust image magnification by the first magnification adjustment when the paper interval time is larger than the first magnification adjustment time, and to adjust image magnification by the second magnification adjustment when the paper interval time is smaller than the first magnification adjustment time.

3. The image forming apparatus of claim 1, wherein the control section is configured to adjust image magnification using both the first magnification adjustment and the second magnification adjustment when the paper interval time is smaller than the first magnification adjustment time.

4. The image forming apparatus of claim 3, wherein the control section is configured to adjust an adjustment amount equivalent to the paper interval time by the first magnification adjustment and to adjust a residual adjustment amount by the second magnification adjustment, when to adjust image magnification using both the first magnification adjustment and the second magnification adjustment.

5. The image forming apparatus of claim 1,
   wherein the image forming apparatus further provides a function forming image in both sides of the recording paper; and,
   the control section controls to execute the first magnification adjustment when a light beam scan for the image forming to one side of the recording paper changes to a light beam scan for the image forming to the other side of the recording paper.

6. The image forming apparatus of claim 1, wherein the control section is configured to adjust an image magnification for adjusting image formed on one side of the recording paper and the other side of the recording paper.

7. The image forming apparatus of claim 1, wherein the control section is configured to adjust an image magnification based on a contraction rate after forming a picture in one side of the recording paper.

* * * * *